United States Patent
Jurski et al.

(10) Patent No.: US 9,891,686 B2
(45) Date of Patent: Feb. 13, 2018

(54) THROTTLING DEVICE POWER

(71) Applicant: INTEL CORPORATION, Santa Clara, CA (US)

(72) Inventors: Janusz Jurski, Hillsboro, OR (US);
Robert Swanson, Olympia, WA (US);
Anil Kumar, Chandler, AZ (US);
Mariusz Oriol, Gdynia (PL);
Waldemar Piotrewicz, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 429 days.

(21) Appl. No.: 14/038,347

(22) Filed: Sep. 26, 2013

(65) Prior Publication Data

US 2015/0089255 A1    Mar. 26, 2015

(51) Int. Cl.
*G06F 1/30*    (2006.01)
*G06F 1/32*    (2006.01)

(52) U.S. Cl.
CPC ............. *G06F 1/30* (2013.01); *G06F 1/329* (2013.01); *Y02B 60/144* (2013.01)

(58) Field of Classification Search
CPC ... G06F 1/28; G06F 1/30; G06F 1/305; G06F 1/32; G06F 1/3206; G06F 1/3215
See application file for complete search history.

(56) References Cited

U.S. PATENT DOCUMENTS

| | | | | |
|---|---|---|---|---|
| 5,434,562 A * | 7/1995 | Reardon | ............ | G06F 21/567 713/193 |
| 9,223,664 B1 * | 12/2015 | Watson | ............ | G06F 11/2015 |
| 2007/0030613 A1 | 2/2007 | Sousa et al. | | |
| 2007/0130382 A1 * | 6/2007 | Moll | ............ | G06F 12/0835 710/22 |
| 2008/0071958 A1 | 3/2008 | Honda et al. | | |
| 2008/0294881 A1 * | 11/2008 | Chen | ............ | G06F 11/3409 712/227 |
| 2009/0198385 A1 * | 8/2009 | Oe | ............ | G06F 1/28 700/296 |
| 2011/0055597 A1 | 3/2011 | Wyatt | | |
| 2011/0219259 A1 * | 9/2011 | Frost | ............ | G06F 11/07 714/6.2 |
| 2012/0079482 A1 | 3/2012 | Wang et al. | | |

(Continued)

FOREIGN PATENT DOCUMENTS

| | | |
|---|---|---|
| CN | 102096460 A | 6/2011 |
| CN | 102597912 A | 7/2012 |

(Continued)

OTHER PUBLICATIONS

Search Report of R.O.C. Patent Application No. 103132773, completed Jul. 22, 2015, 1 page.

(Continued)

*Primary Examiner* — Fahmida Rahman (74) *Attorney, Agent, or Firm* — International IP Law Group, P.L.L.C.

(57) ABSTRACT

An apparatus and system for throttling I/O devices in a computer system is provided. In an example, a method for throttling device power demand during critical power events. The method includes detecting a critical power event and issuing a signal to system devices to defer optional transactions during the critical power event.

26 Claims, 6 Drawing Sheets

(56) References Cited

U.S. PATENT DOCUMENTS

| | | | |
|---|---|---|---|
| 2012/0096287 A1* | 4/2012 | Kamath | G06F 1/3203 |
| | | | 713/300 |
| 2012/0213118 A1 | 8/2012 | Lindsay et al. | |
| 2012/0254644 A1 | 10/2012 | Knolla et al. | |
| 2014/0035560 A1* | 2/2014 | Olmos | G01R 31/31719 |
| | | | 324/76.41 |
| 2014/0195564 A1* | 7/2014 | Talagala | G06F 12/0804 |
| | | | 707/802 |
| 2014/0310539 A1* | 10/2014 | Messick | G06F 1/263 |
| | | | 713/320 |
| 2014/0325117 A1* | 10/2014 | Canepa | G06F 12/0246 |
| | | | 711/103 |

FOREIGN PATENT DOCUMENTS

| | | |
|---|---|---|
| TW | 200917006 A | 4/2009 |
| TW | 201335739 A | 9/2013 |

OTHER PUBLICATIONS

Search Report of R.O.C. Patent Application No. 103132773 filed Sep. 23, 2014 (English Translation), Completed on Oct. 20, 2016, 1 page.

\* cited by examiner

| Transition Event | Signal Line Voltage | OBFF Msg Code |
|---|---|---|
| Idle → OBFF | ‾‾‾\\___ | OBFF ← 304 |
| Idle → CPU Active | ‾‾‾\\_/‾\\___ | CPU Active ← 306 |
| OBFF or CPU Active → Idle | ___/‾‾‾ | Idle ← 302 |
| OBFF → CPU Active | ___/‾\\_/‾\\___ | CPU Active ← 306 |
| CPU Active → OBFF | ___/‾\\___ | OBFF ← 304 |

THROTTLING DEVICE POWER

TECHNICAL FIELD

The present techniques relate generally to throttling devices to save power during critical power events.

BACKGROUND ART

A standard system design parameter for computer systems is that a loss of power for one cycle of the AC power input, e.g., about 17 milliseconds for a 60 hertz power supply, will not interrupt the operation of the system. In order to support this parameter, present power supplies often have large capacitors used to supply power to the system while the AC input is too low. Additionally, power supplies are designed with some amount of rating margin needed to handle worsecase loading conditions on the system. Loading conditions in real use are much lower and the higher loads are present only for a short duration.

Various systems are used to reduce power demand during critical power events, such as under power, thermal excursions, platform power constraints, network power constraints, and the like. However, there is currently no mechanism for throttling the power usage of peripheral component interface (PCI) devices when the need arises. PCI devices often consume as much as 15% of total power. Further, PCI and I/O power as a percentage of the total server power will grow as more high power devices like general purpose (GP) central processing units (CPUs), graphic processing units (GPUs), network based offload processors, and the like are installed in servers. If a platform includes a number of these higher power devices, the power consumption of these devices may constitute more than 50% of the total power required by the platform.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Various techniques may be used to temporarily reduce system power consumption during a critical power fault, such as an AC loss event, a thermal excursion, or a worst case loading scenario. For example, if a system power supply is overloaded, the system may throttle the memory or processors by reducing available bandwidth in order to reduce the loading. For example, a system termed Closed Loop System Throttling (CLST®) may be implemented in systems available from the Intel® Corporation of Santa Clara, Calif. Similarly, in case of a temporary loss of AC power to the power supply, the system may reduce available bandwidth to throttle the power demand in a technique known as Smart Ride Through (SmaRT®). In concert with capacitors located in the power supply, these techniques can enable the system to ride out power disturbances, which may avoid a critical power loss leading to a system shutdown.

Similarly, system power may be managed by a control system, such as node manager, that implements several types of platform power capping policies to limit the total platform power consumption to a defined level. In order to achieve this, the node manager technology uses available processor and memory hardware throttling mechanisms and cooperates with the host operating system.

However, none of these techniques can directly throttle the bandwidth, and, thus, the power demand of the peripheral devices attached to the system through a system bus during critical power events. Current implementations of power management devices can use a technique termed opportunistic flush and fill (OBFF) to manage overall power demand. OBFF is a system state indicated by a signal or command that informs peripheral devices that optional transactions should be deferred during that system state. As used herein, a transaction is a communication that a peripheral device uses to implement a communications operation, such as an interrupt or a direct memory access (DMA). During these operations, system power usage increases as data passes between units over a bus or network. A transaction is used when a device wishes to obtain data or share results during operations. If the peripheral device includes a buffer, the transaction may be considered optional so long as the buffer still holds data for the peripheral device to use, or has space to store results or incoming data. If the buffer is out of data during an OBFF state, a critical transaction may be needed to prevent the peripheral device from going into an idle state. The OBFF state assists system power management by only opening the system bus to operations when peripherals need data to continue functioning.

The intent behind the OBFF state is to align system traffic initiated by various system devices that support this technology and save power by allowing longer time in idle state. Participating internal and external devices receive periodic OBFF indications from a platform controller when the path, or bus, is open for interrupts and DMA (Direct Memory Access) traffic. When the path is closed, participating devices are asked to hold off opportunistic cycles, typically by operating out of local buffers for as long as possible. Eventually, when either the path reopens or when the device has crossed an internal threshold and must access memory or the CPU to maintain an expected Quality of Service, the device issues its request.

In embodiments described herein, the OBFF signaling is used by a system management engine, such as through a node manager, to quickly throttle the peripheral devices during critical power constraints to ensure that the system can prevent a catastrophic shutdown. It can be noted that the node manager, or other types of similar controllers, can be part of any number of system or board controllers, including the Management Engine® from Intel® Corporation, of Santa Clara Calif. These critical events include power events like AC lost, transient load exceeding power supply capacity, thermal overloads of the power supply, and the like. Further, the node manager can quickly throttle the peripheral devices to lower power consumption with an OBFF state if a defined policy limit is reached.

Figure 1:
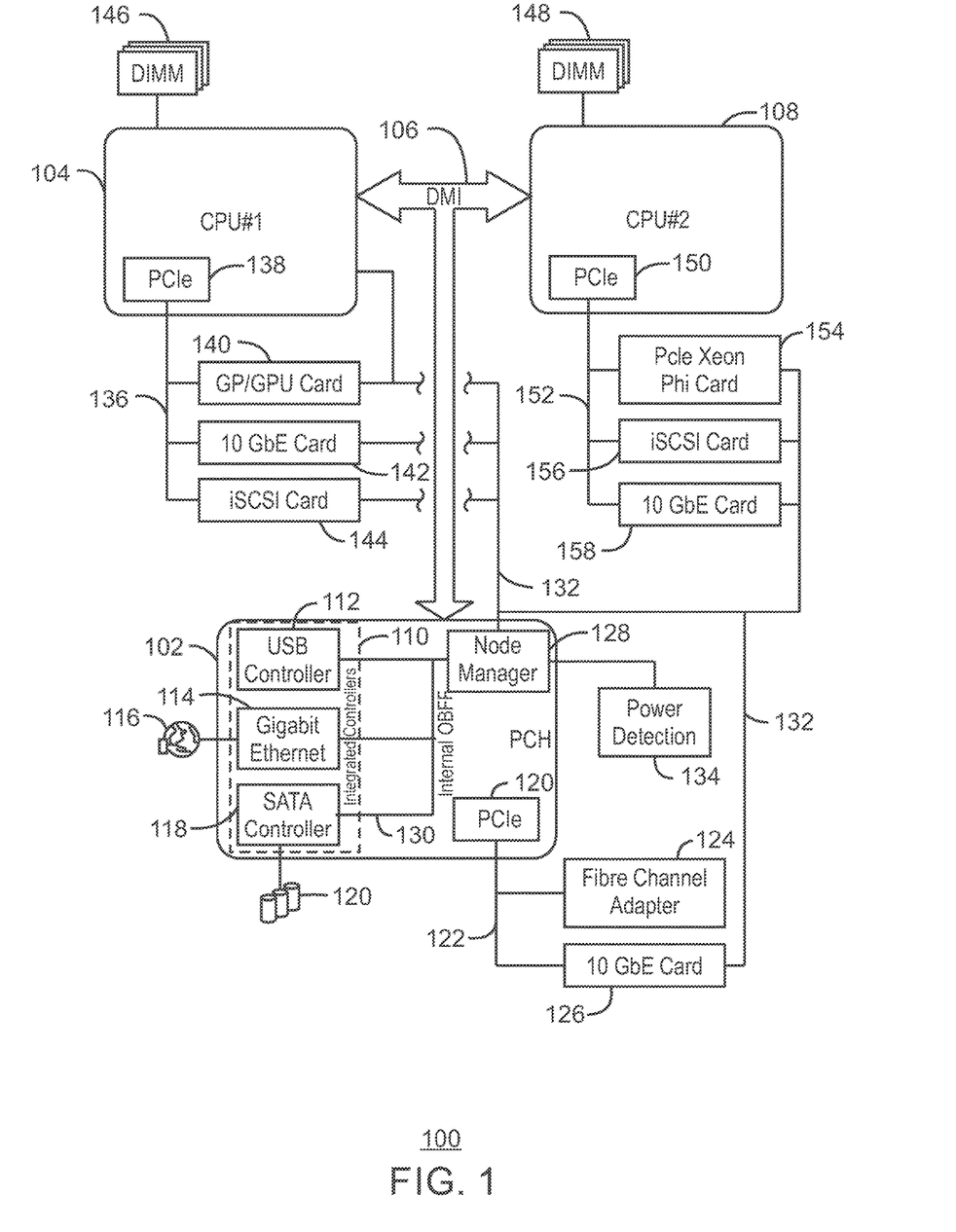
FIG. 1 is a drawing of a computer system using a signal system, such as and opportunistic buffer flush and fill (OBFF), to throttle power demand of devices during critical power events.

FIG. 1 is a drawing of a computer system 100 using a signal system, such as and opportunistic buffer flush and fill (OBFF), to throttle power demand of devices during critical power events. The computer system 100 shown in FIG. 1 is merely an example, as any number of other peripheral devices may be used in addition to those shown. Further, not all of the peripherals or devices shown in FIG. 1 need to be present in a computer system 100. Further, although the bus is often described as a PCIe bus, any number of other buses and communications networks can be used in the techniques described herein, including direct media interface (DMI), Ethernet, Fibre Channel, and PCI, among many others.

The computer system 100 has a platform control hub (PCH) 102 that controls other nodes and basic input/output (I/O) functions for the computer system 100. A first central processing unit (CPU) 104 can be coupled to the PCH 102 through a bus, such as a direct media interface (DMI) 106, allowing high speed communications with the PCH 102. A second CPU 108, and subsequent CPUs, can also be coupled to the PCH 102 through the DMI 106. Each of the system devices 102, 104, and 106, can have internal devices, for example, mounted on a local card. Further, each of the system devices 102, 104, and 106 can have peripheral devices attached through local bus interfaces.

The PCH 102 is often used as the core interface for the computer system 102, and can provide a number of functions. For example, the PCH 102 can include integrated controllers 110, such as a USB controller 112, among others. A gigabit Ethernet (GbE) interface 114 can be used to provide access to the Internet 116. A serial ATA (SATA) 118 controller can be used to interface with a number of storage devices 120. The PCH 102 can also include a PCIe 120 interface to access a local PCIe bus 122. Various devices can be coupled to the PCIe bus 122, such as a Fibre Channel adapter 124, a 10 gigabit Ethernet (GbE) card 126, and others.

The PCH 102 can also include a node manager 128 that can be used to implement power policies and emergency power throttling under the control of a management engine, as described herein. The node manager 128 can be part of a management engine or other type of board controller used to control the power demand of a system. Further, the node manager 128 can include internal storage, such as read-only memory (ROM), programmable read-only memory (PROM), and the like to hold code configured to direct a processor to perform the functions described herein, for example, as described with respect to FIG. 6. The node manager 128 can be coupled to an internal signal line 130 that communicates a status of an OBFF state to the internal controllers 110. If an OBFF state is signaled, for example, under a SmaRT or CLST condition, the internal controllers 110 run using internal buffer memories to store incoming and outgoing data.

In an embodiment, the node manager 128 is also coupled to an external signal line 132 that can be coupled to various PCIe devices to propagate the OBFF signal to those devices. The node manager 128 can send also out an OBFF command as a command string over the DMI 106 and the local PCIe bus 122. In normal operations, the node manager 128 can send out a regular intermittent signal to first open and then close a time window during which devices can implement optional transactions, as discussed with respect to FIGS. 2 and 3.

The node manager 128 can also be communicatively coupled to a power detection system 134. The power-fault detection system 134 can detect critical power events, such as under-voltage conditions, high power draw conditions, thermal conditions, and the like. For example, the power-fault detection system 134 can be integrated with a power supply to monitor the voltage and current inputs and outputs. In an embodiment, if the power-fault detection system 134 communicates a critical power event to the node manager 128, the node manager 128 holds the system in an OBFF state to throttle devices, lowering power consumption. This is discussed further with respect to FIG. 4.

The external signal line 132 can be connected to devices on the local PCIe bus 122 and to devices coupled to local PCIe buses of other units. For example, as shown in FIG. 1, the external signal line 132 is coupled to a 10 GbE card 126 attached to the local PCIe bus 122. Further, it is also coupled to the first CPU 104, and to three devices attached to the first CPU 104 through a local PCIe bus 136 driven from a local PCIe interface 138 on the first CPU 104 card. In this example, the local devices are a graphics processing unit (GPU) 140, a 10 GbE card 142, and an iSCSI card 144. As would be understood, the local devices may be connected to other devices that are not shown, such as a monitor, a network, a disk array, and the like.

The external signal line 132 is used to inform the first CPU 104, and all attached devices 140, 142, and 144 of the OBFF status, e.g., when a window opens or closes for optional transactions. When the external signal line 132 indicates the presence of an OBFF condition the devices will defer optional transactions, including, for example, idling memory accesses from the first CPU 104 to attached dual in-line memory modules (DIMMs) 146, among others. However, devices that are approaching a critical condition, e.g., a buffer overflow or underflow, may still proceed with an interrupt or DMA to maintain quality of service.

In some cases, the PCIe devices may not include a system to monitor the status of the external signal line 132. In this example, the node manager 128 may issue an OBFF status command over coupled buses, such as the DMI 106 and the external PCIe bus 122. For example, the Fibre Channel adapter 124 may be throttled by a command sent over the local PCIe bus 122 that closes any open windows. It can be understood that this also corresponds to not opening a window for optional transactions, as discussed with respect to FIG. 4. Similarly, a command may be sent out over other buses informing attached devices that the window for optional transactions has been opened or closed.

For example, the second CPU 108 and its locally controlled devices are not attached to the external signal line 132. The node manager 128 can send commands over the DMI 106 to the second CPU 108 informing the second CPU 108 when the window is open or closed for optional transactions. When the window is closed, or an idle command is received, the second CPU 108 may limit transactions to the attached DIMM 148. Further, the second CPU 108 may use the internal PCIe interface 150 to issue OBFF commands to devices attached to a local PCIe bus 152. In this example, this may include a processor card 154, an iSCSI card 156, and a 10 GbE card 158, among others.

Advantages of the proposed solution are higher efficiency and power capping range of the SmaRT & CLST techniques during critical power conditions, potentially preventing a catastrophic power supply failure. This will help the node manager 128 to maintain the power within the defined budget, and lower the system's worst-case power draw. Further, the enhanced control may lower the cost and size of the power supply for platform utilizing the technique.

Figure 2:
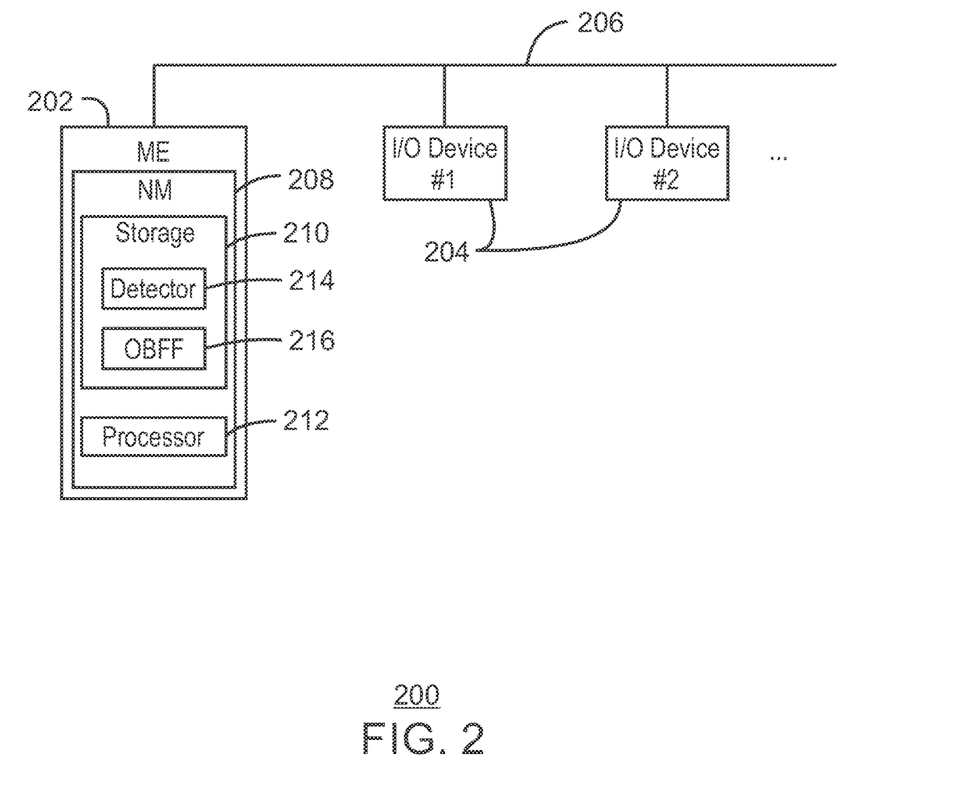
FIG. 2 is another illustration of a system in which a management engine (ME) is issuing an OBFF command to I/O devices over a signal line.

FIG. 2 is another illustration of a system 200 in which a management engine (ME) 202 is issuing an OBFF command to I/O devices 204 over a signal line 206. In this simplified example, no buses are shown. The voltage level and transitions on the signal line 206 can be used to indicate when the window is opened for optional transactions, when the window is closed, and whether an attached CPU is in an idle condition. This is discussed further with respect to FIG. 3.

As shown in FIG. 2, the management engine 202 can include a node manager 208, which can include or utilize a storage system 210 and a processor 212. The node manager 208 may not have a dedicated processor 212, but may be a process run within the management engine 202. Similarly, the storage system 210 may include other functions that belong to the management engine 202 and are outside of the node manager 208. The storage system 210 can include any number of non-transitory storage, such as read only memory (ROM), programmable read only memory (PROM), electrically programmable read only memory (EPROM), hard drives, optical drives, solid-state disks, and the like. The storage system 210 can include a detector module 214 that comprises code configured to direct the processor 212 to determine if a critical power event, such as a thermal excursion, and under power, or a power constraint, has occurred. The storage system 210 can also include a module, such as an OBFF module 216, configured to direct the processor to instruct other devices, for example, I/O Devices 204, to defer optional transactions during the critical power event. Under the direction of code within the OBFF module 216, the node manager 208 may manage an OBFF communication system with other units, for example, over the signal line 206 or through bus communications.

In current systems, the ME does not have any mechanism to directly control I/O device power consumption. This capability is the key to enable ME to control power consumption by the I/O subsystems, for example, attached to buses that are external to the platform controller hub. In some embodiments, OBFF signaling will be supported by most standard PCIe devices, allowing power consumption for the entire system to be controlled.

Figure 3:
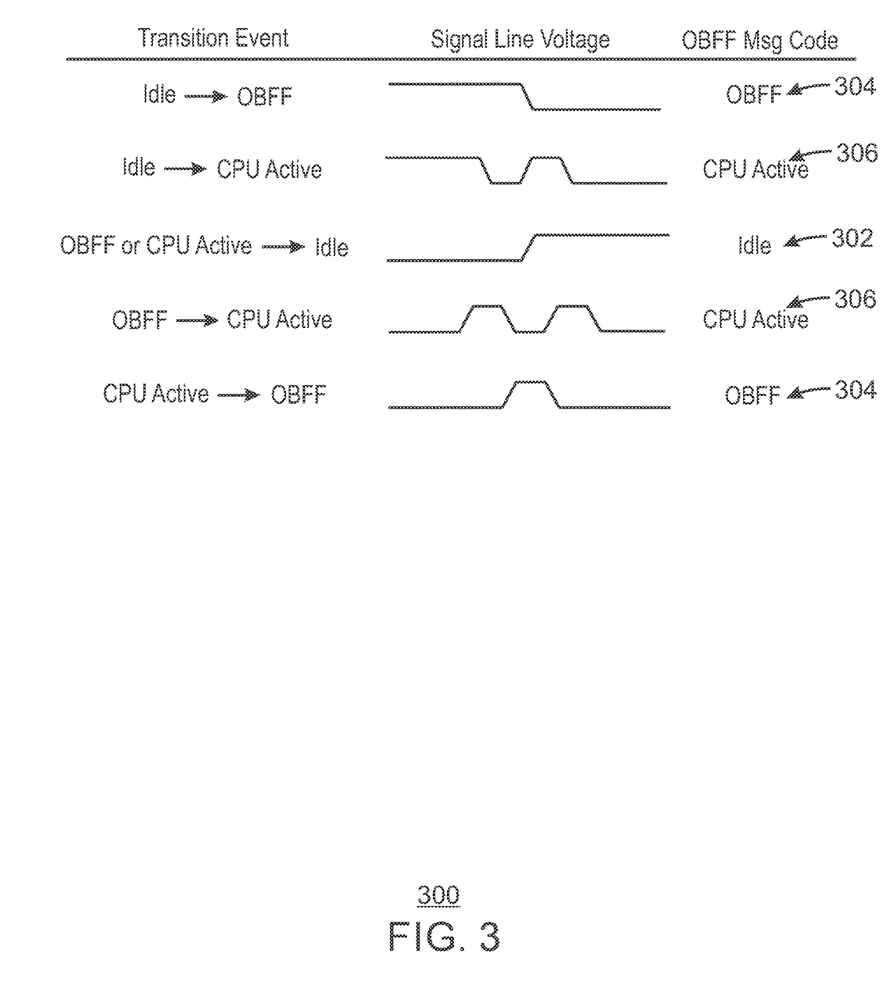
FIG. 3 is a chart of state transitions on an OBFF line that may be used to communicate operational states to devices.

FIG. 3 is a chart 300 of state transitions on an OBFF line that may be used to communicate operational states to devices. The transitions indicated in this table assume three states: an idle state 302, in which the system is in an idle, low power mode; an OBFF state 304, in which the system buses and memory paths are available for critical transactions only; and a CPU active state 306, in which the system is available for all transactions.

In the embodiment shown in FIG. 3, a high level on the signal line indicates an idle condition 302, while a low level may indicate either an OBFF state or a CPU active state. If the signal line is in a low voltage state, a status change may be indicated by the number of sequential state changes. In this example, two sequential downward transitions leaving the line in a low voltage state indicates a CPU active 306 status, while a single downward transition that leaves the line in a low voltage state indicates an OBFF status. However, the transitions and states shown in FIG. 3 are merely examples, as any number of different transitions could be used to indicate the states.

If the devices are not equipped for the signal line, an OBFF command can be used to indicate the status. The command may consist of an initial bit sequence identifying the command as an OBFF command and determining the routing, followed by a bit sequence to indicate the type of status desired. For example, a four bit sequence "1111" may be used to indicate the CPU active 306 state, while the four bit sequence "0001" may be used to indicate the OBFF state 304. Similarly, the four bit sequence "0000" may be used to indicate that the idle state has been entered.

Figure 4:
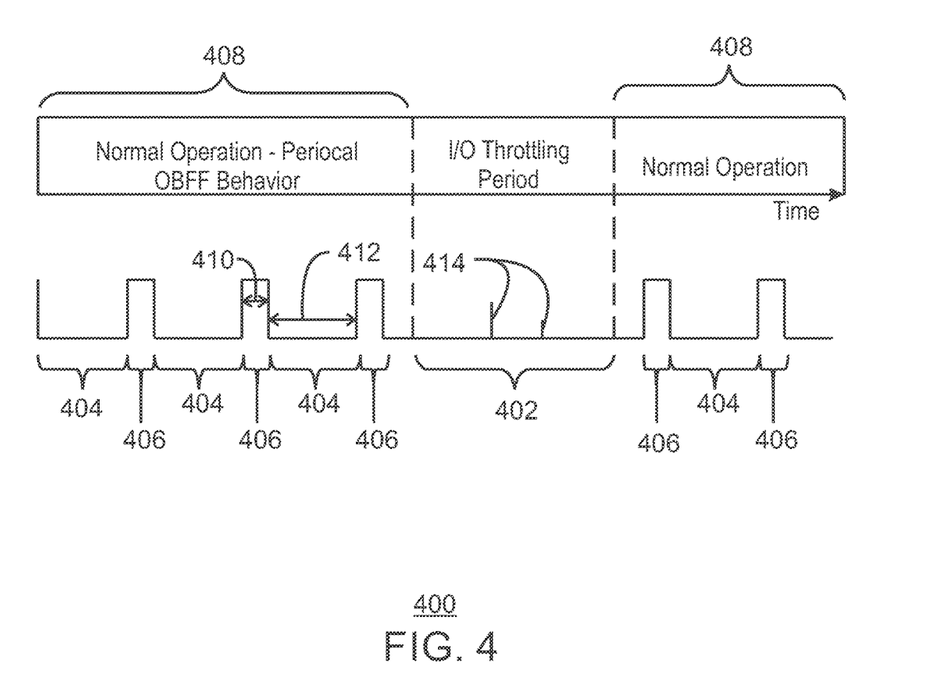
FIG. 4 is a transition diagram showing throttling of data and power usage during an I/O throttling period.

FIG. 4 is a transition diagram 400 showing throttling of data and power usage during an I/O throttling period 402. The transition diagram 400 assumes switching between two states: the OBFF state 404, in which the window is closed to optional transactions; and a CPU active state 406, in which the window is opened for optional transactions. Critical transactions can still occur at any time, but will increase system power demand.

During normal operation 408, the OBFF state 404 is generally active, deferring critical transactions. At regular intervals, a CPU active state 406 is entered as described with respect to FIG. 3. The CPU active state 406 is kept open for a sufficient interval 410 to allow all I/O and peripheral units to complete DMA transactions. The OBFF state 404 is then reentered, decreasing power demand. The length 412 of the OBFF state 404 can be determined by the I/O unit with the shortest latency time, e.g., the highest demand for data access. Generally, during normal operation 408, extra interrupts will be rare and will be caused by unusual events, for example, the transfer of a large amount of data, among others.

If a critical power fault is detected, the I/O throttling period 402 may be implemented by leaving the system in the OBFF state 404 and not opening the path for interrupts and DMA traffic. Occasional critical transactions 414 may come from devices that have a short latency period, but most interrupts and traffic will be suppressed, lowering power consumption.

The techniques described herein are not limited to the periods 410 and 412 shown. Other changes to the length and frequency of the OBFF state 404 and the CPU Active state 406 can be made to tune the power consumption during the I/O throttling period 402 or normal operation 408. For example, the I/O throttling period 402 may not completely stop optional transactions, but may, instead, decrease the frequency of the CPU active state 406, for example, by increasing the length 412 of the OBFF state 404. Further, the throttling can be tapered by increasing the length of the OBFF state 404 at the beginning or at the end of the I/O throttling period 402, both. These changes may be made, at least in part, on the frequency of the occasional critical transactions 414.

Figure 5:
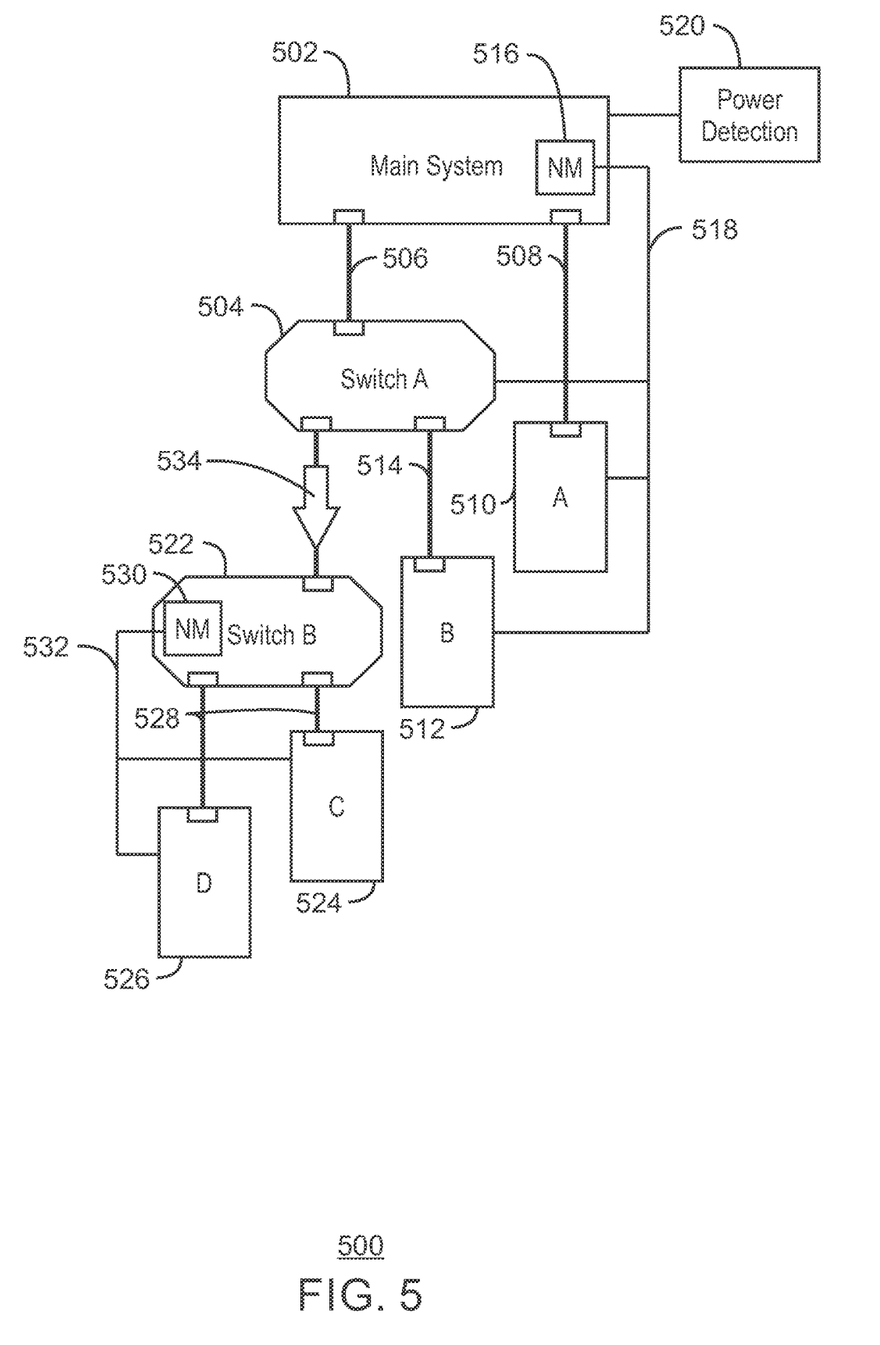
FIG. 5 is a block diagram of a system that uses can use an OBFF signal to throttle auxiliary devices through interconnected switches.

FIG. 5 is a block diagram of a system 500 that uses can use an OBFF signal to throttle auxiliary devices through interconnected switches. The techniques described herein are not limited to single systems, but may be used to control the throttling of power in larger systems. For example, a critical power event in a cluster of systems may indicate a need for throttling the entire cluster.

As an example, a main system 502 may be coupled to a switch A 504 through a network 506, such as an Ethernet connection. A second network 508 may couple the main system 502 to various other endpoints, such as A 510. These endpoints can include other systems, processors, I/O devices, storage devices, and the like. Switch A 504 can couple the main system 502 to other endpoints, such as B 512, through additional network connections 514. The main system 502 can include a node manager 516 controlling a signal line 518 that can communicate an OBFF signal to the switch A 504 and the endpoints A 510 and B 512. The OBFF signal can be used for throttling the networked units in case of a critical power fault, for example, as detected by a power detection module 520 coupled to the main system 502.

The switch may couple further network units, such as another switch B 522. Switch B 522 may provide communications to other endpoints, such as C 524 and D 526, through network lines 528. Switch B 522 may also include a local node manager 530 that can control a signal line 532 to communicate an OBFF status to the endpoints C 524 and D 526. However, switch B 522 may be remotely located from the main system 502, for example, in a cabinet on the opposite side of a data center.

If a broad OBFF status change is needed, for example, due to a power fault in the feed to a data center, the main system 502 can change the status of the control line 518 to indicate the OBFF state to the local devices, and send an OBFF message 534 through switch A 504 to switch B 522. Switch B 522 can then indicate the OBFF status through the local control line 532.

It can be understood that FIG. 5 provides a simplified example. Larger systems are not limited to the units shown, but can often have many more units. Further, systems do not have to have all of the units shown. For example, the main system 502 may communicate exclusively through switches, and have no directly connected endpoints, such as A 510. Further, multiple layers of switches may be present in larger systems. It can also be noted that this configuration may be used to implement throttling of certain regions of a network 500 under the control of the master system 502, without throttling the entire network 500. This may be performed by sending commands only to the regions having power issues.

Figure 6:
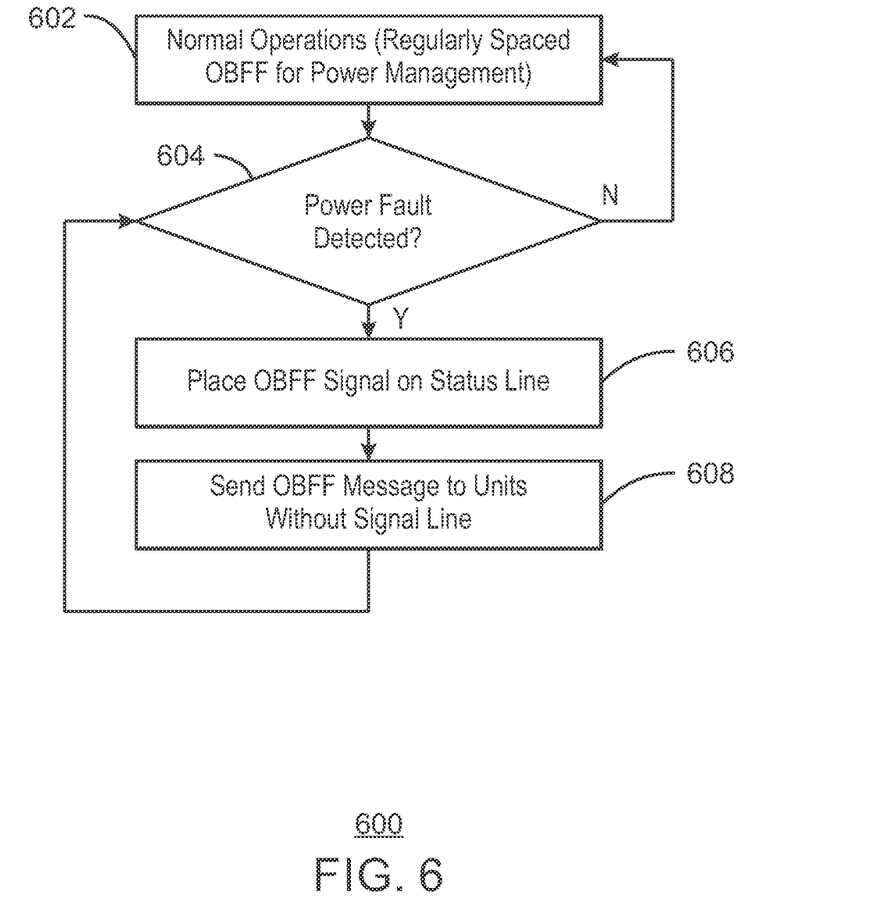
FIG. 6 is a method for throttling power demand using an OBFF signal.

FIG. 6 is a method 600 for throttling power demand using an OBFF signal. The method 600 can be implemented, for example, by systems 100 or 500, discussed above. The method starts at block 602 with the computer system in normal operations. At block 604, a power fault is detected. This may be performed by polling a power-fault detection system, or by an interrupt from a processor in a power monitor. If no fault is detected, process flow continues at block 602 with normal operations.

If a power fault is detected, at block 606 the OBFF status is changed to indicate that optional transactions can be deferred, for example, by changing or holding the state of a status line in an OBFF state. Process flow may pass to block 608 to send OBFF messages to units that are not connected to a status line. Process flow may then resume at block 604 to determine if the power fault or issue has ended. Once the power fault is over, process flow resumes at block 602 with normal operations.

The method 600 does not need to have all of the blocks shown above. For example, if all of the units are coupled to a signal line, block 608 may be eliminated. Similarly, if an older network does not have the physical hardware to implement a signal line, block 606 may be eliminated.

Example 1

In an example, a computing device includes a method for throttling device power demand during critical power events, comprising: detecting a critical power event; and issuing a signal to system devices to defer optional transactions.

Example 2

In another example, a system for controlling power usage includes a power-fault detection system, a plurality of peripheral devices, and a control system. The control system is configured to receive a signal from the power-fault detection system indicating a power fault and send a signal to the plurality of peripheral devices to defer optional transactions.

Example 3

In another example, a system that throttles back power usage in peripheral devices in a computer system includes a system management engine that includes a power detection system and an opportunistic buffer flush and fill (OBFF) controller. A signal line couples the OBFF controller to a peripheral device and a communications bus couples the OBFF controller to a second peripheral device. A module includes code configured to direct the system management engine to detect a power fault and issue an OBFF command to a coupled peripheral device.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for throttling device power demand during critical power events, comprising:
detecting a critical power event; and
in response to the detection of the critical power event, issuing a signal from a controller to a peripheral device to defer non-essential transactions including accesses to a main system memory during the critical power event, to indicate a condition of an opportunistic buffer flush and fill (OBFF) state during the critical power event, and to operate out of a local buffer of the peripheral device without accessing any device external to the peripheral device as long as the local buffer is not in an underflow condition, wherein the peripheral device, in response to a local buffer underflow condition during the OBFF state, performs a critical interruption to access the main system memory via a direct memory access operation, wherein the OBFF state allows the peripheral device to continue functioning without shifting to any idle states and wherein the OBFF state does not allow the peripheral device to access system busses except for the critical interruption.

2. The method of claim 1, comprising:
determining if the critical power event has ended, and, if so,
resuming normal operations.

3. The method of claim 1, comprising detecting an underpower event.

4. The method of claim 1, comprising detecting a thermal excursion of a power supply.

5. The method of claim 1, comprising changing a state of a signal line to indicate the opportunistic buffer flush and fill (OBFF) state to system devices.

6. The method of claim 1, comprising deferring non-critical interrupts from system devices.

7. The method of claim 1, comprising deferring non-critical dynamic memory accesses (DMA) from system devices.

8. The method of claim 1, comprising allowing critical interrupts from devices.

9. The method of claim 1, wherein the issuing of the signal to the peripheral device throttles a number of transactions to and from the peripheral device.

10. A system for controlling power usage, comprising:
a power-fault detection system; and
a control system, wherein the control system is configured to:
detect a signal from the power-fault detection system indicating a power fault event; and
in response to detecting the signal from the power-fault detection system, send a signal from the control system to a peripheral device to defer non-essential transactions including accesses to a main system memory during the power fault event, to indicate a condition of an opportunistic buffer flush and fill (OBFF) state during the power fault event, and to operate out of a buffer local to the peripheral device without accessing any device external to the peripheral device as long as the local buffer is not in an underflow condition, wherein the peripheral device, in response to a local buffer underflow condition during the OBFF state, performs a critical interruption to access the main system memory via a direct memory access operation, wherein the OBFF state allows the peripheral device to continue functioning without shifting to any idle states and wherein the OBFF state does not allow the peripheral device to access system busses except for the critical interruption.

11. The system of claim 10, wherein the power-fault detection system comprises a power supply configured to detect a thermal excursion.

12. The system of claim 10, wherein the power-fault detection system is configured to detect a low voltage condition.

13. The system of claim 10, comprising a PCIe bus.

14. The system of claim 10, comprising a signal line coupled to the control system and the peripheral device, wherein the signal line indicates a status of the opportunistic flush and fill (OBFF) state.

15. The system of claim 10, comprising the peripheral device coupled to a signal line, wherein the peripheral device is configured to defer the non-essential transactions based, at least in part, on a voltage level applied to the signal line.

16. The system of claim 10, wherein the peripheral device comprises a graphics processing unit (GPU), a gigabit Ethernet card (GbE), a small computer system interface (SCSI), a central processing unit (CPU), a memory device, a switch, or any combinations thereof.

17. The system of claim 10 comprising a switch configured to receive a throttling message over a communications bus and change a voltage on a signal line in response to the throttling message.

18. A system that throttles back power usage in peripheral devices in a computer system, comprising:
a system management engine comprising:
a power detection system; and
an opportunistic buffer flush and fill (OBFF) controller;
a signal line coupling the OBFF controller to a peripheral device;
a communications bus coupling the OBFF controller to a second peripheral device; and
a module comprising code configured to direct the system management engine to detect a power fault event, and in response to the detection of the power fault event, issue a signal from the controller to the peripheral device to defer non-essential transactions including accesses to a main system memory during the power fault event, and to indicate a condition of an opportunistic buffer flush and fill (OBFF) state during the power fault event, and to operate out of a local buffer of the peripheral device without accessing any device external to the peripheral device as long as the local buffer is not in an underflow condition, wherein the peripheral device, in response to a local buffer underflow condition during the OBFF state, to access the main system memory via a direct memory access operation, wherein the OBFF state allows the peripheral device to continue functioning without shifting to any idle states and wherein the OBFF state does not allow the peripheral device to access system busses except for during the underflow condition.

19. The system of claim 18, wherein the signal indicating the OBFF state comprises a request for a change in a voltage level on the signal line.

20. The system of claim 18, wherein the signal indicating the OBFF state comprises a command sent over the communications bus.

21. The system of claim 18, wherein the communications bus is a PCIe bus.

22. A non-transitory, computer readable medium comprising code configured to control a node manager to throttle device power demand during critical power events, comprising:
   code configured to detect a critical power event;
   code configured to in, response to the detection of the critical power event, issue a signal from a controller to a peripheral device to defer non-essential transactions including accesses to a main system memory during the critical power event, issue a command over a bus to indicate a condition of an opportunistic buffer flush and fill (OBFF) state during the critical power event, and operate out of a local buffer of the peripheral device without accessing any device external to the peripheral device as long as the local buffer is not in an underflow condition, wherein the peripheral device, in response to a local buffer underflow condition during the OBFF state, performs a critical interruption to access the main system memory via direct memory access operation, wherein the OBFF state allows the peripheral device continue function without shifting to any idle states and wherein the OBFF state does not allow the peripheral device to access system busses except for the critical interruption.

23. The non-transitory, computer readable medium of claim 22, comprising:
   code to direct the node manager to determine if the critical power event has ended, and, if so,
   code to direct the node manager to resume normal operations.

24. The non-transitory, computer readable medium of claim 22, comprising code to direct the node manager to detect an under-power event.

25. The non-transitory, computer readable medium of claim 22, comprising code to direct the node manager to detect a thermal excursion of a power supply.

26. The non-transitory, computer readable medium of claim 22, comprising code to direct the node manager to change a state of a signal line to indicate the opportunistic buffer flush and fill (OBFF) state to system devices.

* * * * *